US012608896B2

(12) United States Patent
Ng-Thow Hing et al.

(10) Patent No.: US 12,608,896 B2
(45) Date of Patent: Apr. 21, 2026

(54) PROGRESSIVE BODY CAPTURE OF USER BODY FOR BUILDING AN AVATAR OF USER

(71) Applicant: APPLE INC., Cupertino, CA (US)

(72) Inventors: Victor Ng-Thow Hing, Los Altos, CA (US); Timothy B. Henning, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 18/124,775

(22) Filed: Mar. 22, 2023

(65) Prior Publication Data

US 2023/0290096 A1      Sep. 14, 2023

Related U.S. Application Data

(63) Continuation of application No. PCT/US2021/049788, filed on Sep. 10, 2021.

(60) Provisional application No. 63/083,193, filed on Sep. 25, 2020.

(51) Int. Cl.
| | |
|---|---|
| *G06T 19/20* | (2011.01) |
| *G06T 7/50* | (2017.01) |
| *G06T 13/20* | (2011.01) |
| *G06T 13/40* | (2011.01) |
| *G06V 40/16* | (2022.01) |
| *G06V 40/20* | (2022.01) |

(52) U.S. Cl.
CPC ................ *G06T 19/20* (2013.01); *G06T 7/50* (2017.01); *G06T 13/205* (2013.01); *G06T 13/40* (2013.01); *G06V 40/174* (2022.01); *G06V 40/20* (2022.01); *G06T 2207/20044* (2013.01); *G06T 2207/30196* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 2013/0257877 A1* | 10/2013 | Davis | ..................... | G06N 3/006 |
| | | | | 345/473 |
| 2014/0225978 A1* | 8/2014 | Saban | ................... | G06T 7/0012 |
| | | | | 348/14.07 |
| 2016/0134840 A1 | 5/2016 | McCulloch | | |
| 2019/0266390 A1 | 8/2019 | Gusarov et al. | | |

(Continued)

FOREIGN PATENT DOCUMENTS

WO        2019/217177 A1    11/2019

OTHER PUBLICATIONS (PCT) European Patent Office (ISA/EP), International Search Report and Written Opinion, International Application No. PCT/US2021/049788, 12 pages, Nov. 26, 2021.

*Primary Examiner* — Peter Hoang
(74) *Attorney, Agent, or Firm* — Thompson Hine LLP

(57) ABSTRACT

Various implementations disclosed herein include devices, systems, and methods that progressively capture data representing an actual appearance of a user for creating a 3D avatar of the user. Image sensors at a user's electronic device may capture images (or other sensor data) of different portions of a user's body over time. Images and other sensor data that is captured initially or at a given time may not represent all of the user's body. Thus, in some implementations, the progressively captured data provides representations of additional portions of the user's 3D avatar over time.

20 Claims, 8 Drawing Sheets

470a

470b

470c

470d

470e

470f

470g

(56)  References Cited

U.S. PATENT DOCUMENTS

| | | |
|---|---|---|
| 2019/0362529 A1 | 11/2019 | Wedig et al. |
| 2020/0089313 A1 | 3/2020 | Himane |
| 2020/0175739 A1 | 6/2020 | Meister et al. |

* cited by examiner

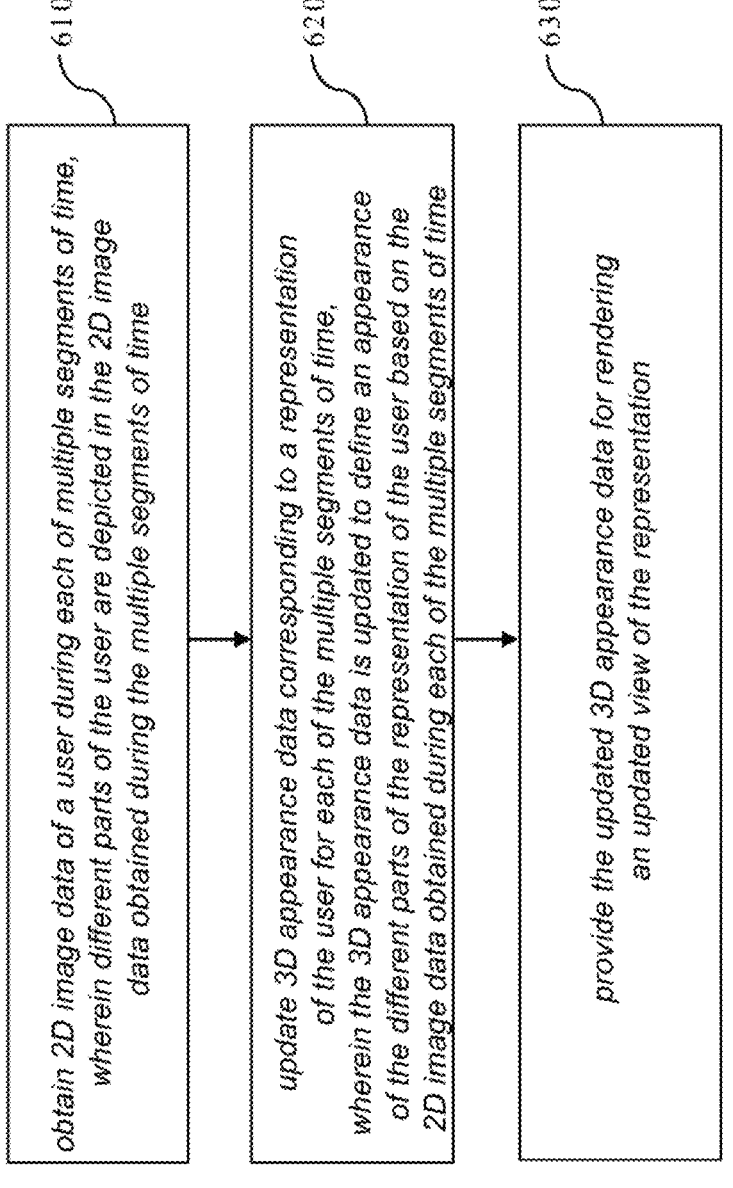

obtain 2D image data of a user during each of multiple segments of time, wherein different parts of the user are depicted in the 2D image data obtained during the multiple segments of time
610 update 3D appearance data corresponding to a representation of the user for each of the multiple segments of time, wherein the 3D appearance data is updated to define an appearance of the different parts of the representation of the user based on the 2D image data obtained during each of the multiple segments of time
620 provide the updated 3D appearance data for rendering an updated view of the representation
630

FIGURE 6

PROGRESSIVE BODY CAPTURE OF USER BODY FOR BUILDING AN AVATAR OF USER

CROSS-REFERENCE TO RELATED APPLICATIONS

This application is a continuation of International Application No. PCT/US2021/049788 filed on Sep. 10, 2021, which claims the benefit of U.S. Provisional Application No. 63/083,193 filed on Sep. 25, 2020, both entitled "PRO-GRESSIVE BODY CAPTURE OF USER BODY FOR BUILDING AN AVATAR OF USER," each of which is incorporated herein by this reference in its entirety.

TECHNICAL FIELD

The present disclosure generally relates to providing a three-dimensional (3D) representation of a user of an electronic device and, in particular, to systems, methods, and devices that progressively capture data representing an actual appearance of a user for creating the 3D representation of the user.

BACKGROUND

In certain circumstances, a representation of a user (e.g., avatar) are pre-built using simple to relatively complex design interfaces. However, pre-designed interactive avatars are not realistic depictions of the user operating the electronic device.

SUMMARY

Various implementations disclosed herein include devices, systems, and methods that progressively capture data representing an actual appearance of a user for creating a 3D avatar of the user. Image sensors at a user's electronic device may capture images (or other sensor data) of different portions of a user's body over time. Images and other sensor data that is captured initially or at a given time may not represent all of the user's body. Thus, in some implementations, the progressively captured data provides representations of additional portions of the user's 3D avatar over time. For example, at first, image sensors at the user's device may capture images of only the back of the user's hands, so only a representation of the hands that shows surface coloring of the back of the hands may be captured. Then, as usage of the electronic device continues and additional images including the user's palms are captured, additional information, such as surface coloring, of the user's palms may be used to update the representation of the avatar. In some implementations, the avatar representing the user is updated to be more complete and accurate over time.

Various implementations disclosed herein include devices, systems, and methods that progressively send 3D appearance data corresponding to a representation (e.g., avatar) of a user of an electronic device. In some implementations, the representation of the user is a composite 3D representation accumulated over time based on only what is directly observed by sensors of the device. In some implementations, the representation of the user corresponds to an appearance of the user on that day or at that specific time. For example, as a user rolls up his or her sleeves of a long sleeve shirt, the avatar may be updated to show the user's currently exposed arms. In some implementations, the image sensors of the electronic device have a limited field of view (FOV) that cannot sense the whole body of the user at one time from a single viewpoint. In some implementations, the representation of the user includes 3D appearance data from more than a single sensor (e.g., more than 1 frame of image data). In some implementations, the 3D representation of the user includes a temporal characteristic or condition. In one example, the representation of the user includes only current 3D appearance data and when the user looks away, that corresponding part of the representation disappears. In another example, accumulated 3D appearance data in the 3D representation may be preserved until the device is turned off.

In some implementations at an electronic device, a method includes obtaining 2D image data of a user during each of multiple segments of time, wherein different parts of the user are depicted in the 2D image data obtained during the multiple segments of time. For example, this may involve obtaining first 2D image data during a first segment of time and depicting a first part of a user and obtaining second 2D image data during a second segment of time and depicting a second part of a user different than the first part; In some implementations, 3D appearance data is updated corresponding to a representation of the user for each of the multiple segments of time, wherein the 3D appearance data is updated to define an appearance of the different parts (e.g., the first and second parts) of the representation of the user based on the 2D image data obtained during each of the multiple segments of time. The updated 3D appearance data is provided for rendering an updated view of the representation of the user for each of the multiple segments of time.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart that illustrates an exemplary method of progressively capturing data determining an appearance of a representation of a user in accordance with some implementations.

Figure 1:
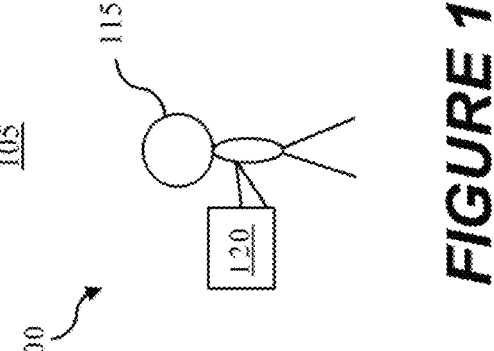
FIG. 1 illustrates an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example operating environment 100 in which electronic device 120 is used in physical environment 105. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a head-mounted device (HMD), and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, sensors, and the like. The multiple devices that may be used to accomplish the functions of the device 120 may communicate with one another via wired or wireless communications.

Various implementations disclosed herein include devices, systems, and methods that progressively capture data representing an actual appearance of a user for creating a 3D representation (e.g., avatar) of the user. In some implementations, 3D appearance data determining the representation of the user of the electronic device is progressively sent to a second electronic device. In some implementations, the representation of a user provides a real-time or current appearance of the user as the user is operating the device.

In some implementations, image sensors of the HMD may include an array of outward, inward, or downward facing image sensors. In some implementations, the image sensors of the HMD have a limited FOV that can see a portion of the body of the user at one time from a single viewpoint. In some implementations, portions of the body of the user are only detected when the user glances or looks at that portion of their body. For example, the image sensors of the HMD may only detect an arm of the user when the user glances or looks at that arm.

In some implementations, the representation of the user is progressively accumulated or built over time (e.g., a composite 3D representation) based on only what is directly observed by sensors of the HMD. Thus, in some implementations, the representation of the user includes image data from more than a single view (e.g., more than 1 frame of data or image).

In some implementations, the representation of the user includes a temporal characteristic or condition. For example, the accumulated or updated 3D appearance data corresponding to the representation may be preserved for a prescribed interval of time such as 30 seconds or for the entire length of device operation. In some implementations, the representation of the user includes only recent 3D appearance data (e.g., 10 seconds) and that corresponding part of the 3D appearance data of the representation disappears (e.g., after 10 seconds).

In some implementations, the 3D appearance data of the representation of the user determines or uses structural information (e.g., pose, dimensional information), appearance information (e.g., color or surface information of skin/clothing including texture), facial expressions, synchronized audio, other aspects of the users body, etc. using only sensor data from sensors at the HMD over time. In some implementations, the accumulated 3D appearance data of the user is combined with a generic human body model (e.g., including joints, skeleton, deformable shapes or surfaces) to generate a customized 3D body model of the user. In some implementations, the customized 3D body model for the user is generated using 2D image data, 3D image data, depth data, etc. from the sensors at the HMD. In some implementations, the customized 3D body model for the user is generated using machine learning (ML) techniques. In some implementations, the customized 3D body model for the user is refined over time to more closely approximate the shape, pose, deformation, surface information using feedback or feed-forward computer vision or modeling techniques.

In some implementations, the 3D representation of the user is an avatar. In some implementations, the avatar is initially a default avatar with little-to-no appearance data unique to the user, but is subsequently modified over time to include one or more visual features that reflects the user as they look on that day or at that specific time of day (e.g., rolls up the sleeves of a long sleeve shirt). In some implementations, the avatar is a photo-realistic avatar of the user.

Figure 2:
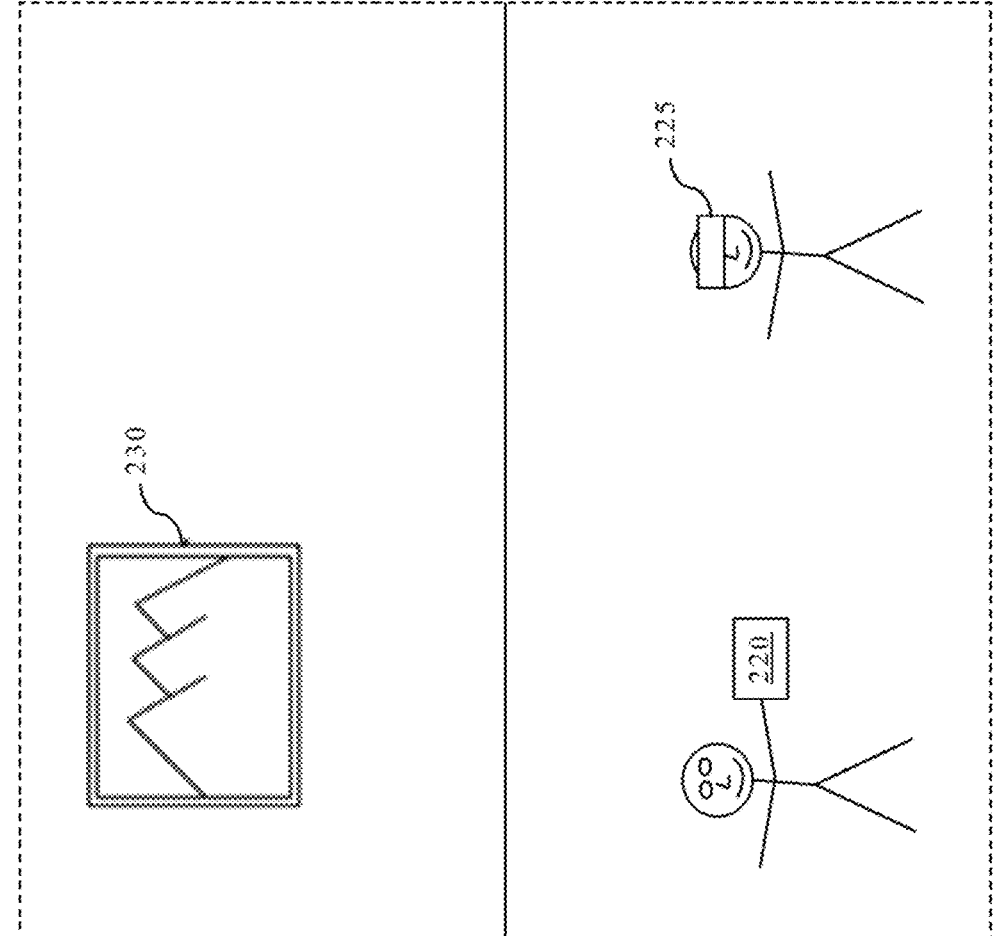
FIG. 2 is a block diagram that illustrates an example environment.

Referring to FIG. 2, a physical environment 205 includes a first electronic device 220 being used by a first user and a second electronic device 225 being used by a second user. In this example, the environment 205 is a room that includes picture 230. The two devices 220, 225 can operate alone or interact with additional devices not shown to capture images of the environment, detect or track objects in those images, or to present XR content based on the images and the detected/tracked objects. Each of the two devices 220, 225 may communicate wirelessly or via a wired connection with a separate controller (not shown) to perform one or more of these functions. Similarly, each of the two devices 220, 225 may store information useful for the XR environment or may communicate with a separate device such as a server or other computing device that stores this information. In some implementations, a device, such as device 225, is a head-mounted device (HMD) that is worn by the second user. In some implementations, a device, such as the first device 220 is a handheld electronic device (e.g., a smartphone or a tablet) configured to present the XR environment to the first user.

In some implementations, the first or second device 220, 225 enable the user to change the viewpoint or otherwise modify or interact with the XR environment. In some implementations, the first or second device 220, 225 are configured to receive user input that interacts with displayed XR content. For example, a virtual object such as a 3D representation of a real-world person or object, or informational displays each with interactive commands may be presented in the XR content. A user may reposition the virtual object or informational displays relative to the depicted real objects or interact with the interactive commands by providing user input on or otherwise using the respective device.

Figure 3:
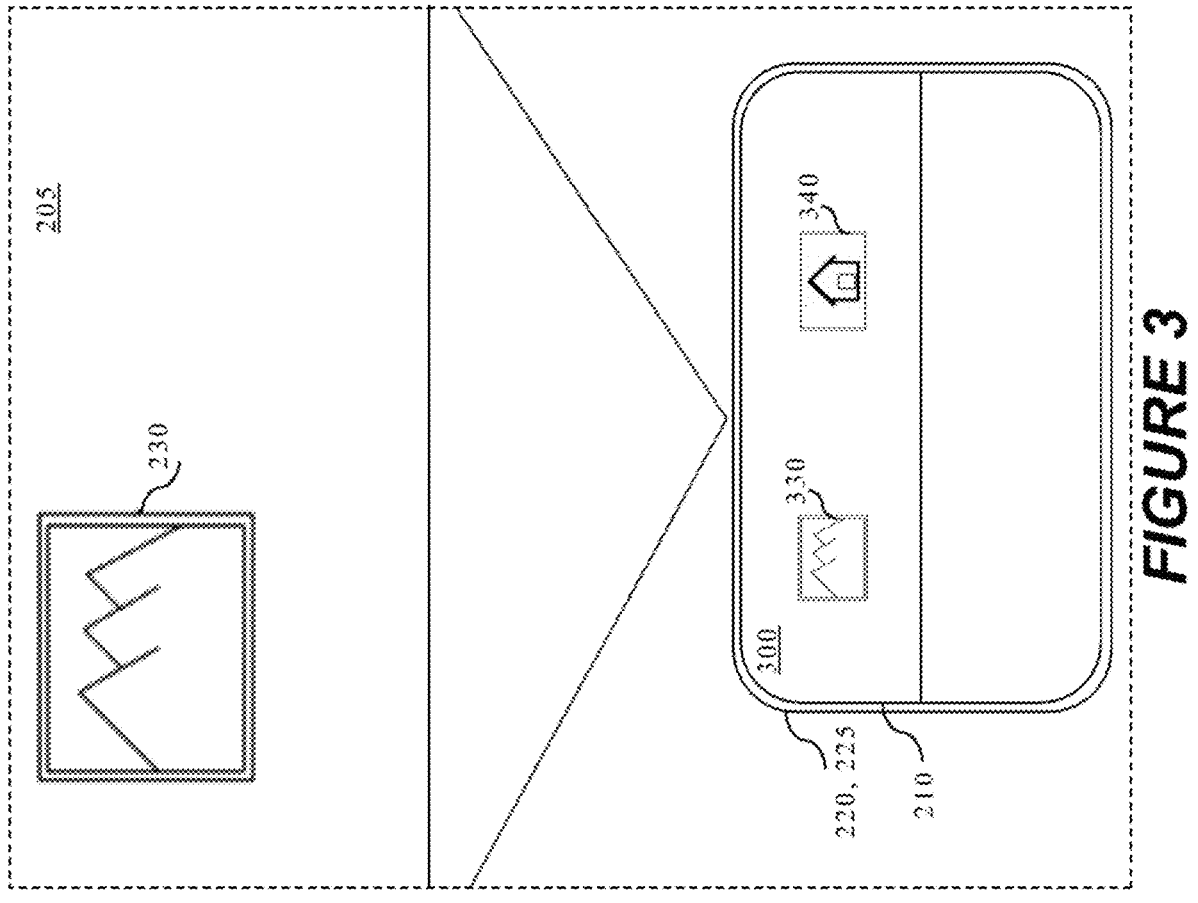
FIG. 3 is a block diagram that illustrates a mobile electronic device capturing a frame of a sequence of frames in the environment of FIG. 2 in accordance with some implementations.

FIG. 3 is a block diagram of the first or second device 220, 225 displaying a XR environment 300 based on the physical environment 205 of FIG. 2 in a display 210 in accordance with some implementations. The XR environment 300 may be generated from a frame of a sequence of frames captured by the first or second device 220, 225, for example, when executing an application in the physical environment 205. As shown in FIG. 3, the first or second device 220, 225 displays XR environment 300 including a depiction 330 of the picture 230 and virtual content 340. In some implementations, the XR environment 300 is shared by the first device 220 and the second device 225.

Figure 4:
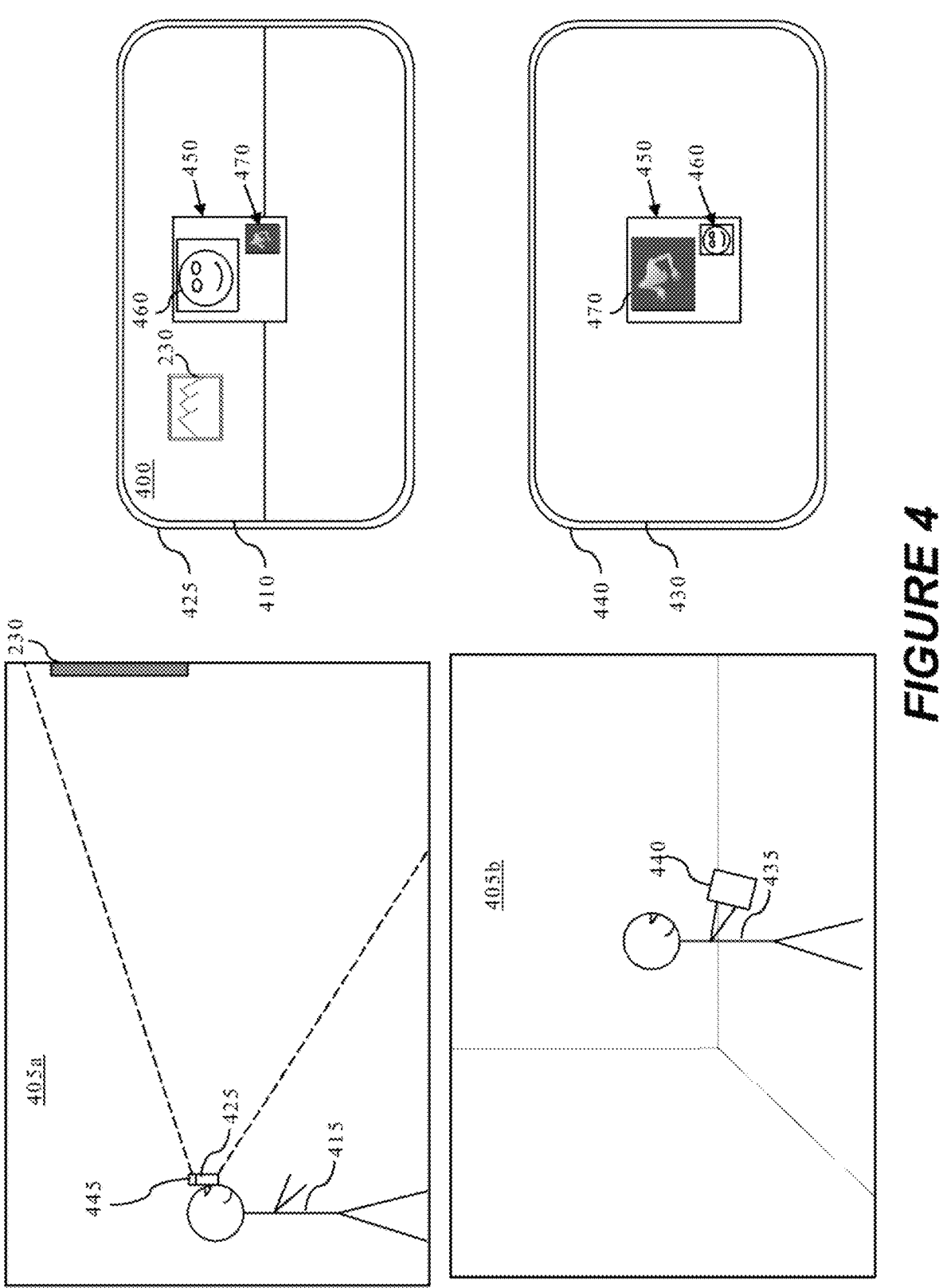
FIG. 4 is a diagram that illustrates an exemplary extended reality (XR) environment including a representation (e.g., avatar) of a user of an electronic device during a communication session with another electronic device in accordance with some implementations.

FIG. 4 is a diagram that illustrates an exemplary XR environment including a representation (e.g., avatar) of a user of an electronic device during a communication session with another electronic device. As shown in FIG. 4, a HMD 425 displays a XR environment 400 based on a physical environment 405a generated from data captured by sensors 445 using a display 410 in accordance with some implementations. In some implementations, the communication session between the HMD 425 and a mobile electronic device 440 includes execution of an application such as video telephone application 450. As shown in FIG. 4, a mobile electronic device 440 in a physical environment 405b executes the video telephone application 450 using a portion of a display 430.

In some implementations, the video telephone application 450 includes live video or a static avatar 460 of a user 435 of the mobile electronic device 440 and a representation 470 of the user 415. In some implementations, the HMD 425 progressively captures, updates, and sends data determining an appearance of a representation 470 of a user 415 during the video call with the mobile electronic device 440. In some implementations, the representation 470 includes updated 3D appearance data defining an appearance of the different parts of the representation 470 of the user 415 based on image data from the sensors 445 obtained while executing the video telephone application 450.

In some implementations, the representation 470 of the user 415 illustrates what the user 415 currently looks like while wearing the HMD 425 while executing the video telephone application 450.

In some implementations, the representation 470 of the user 415 is progressively accumulated or built over time based on only what is directly observed by the sensors 445 of the HMD 425. For example, the sensors 445 of the electronic device have a limited FOV that cannot sense the whole body of the user at one time from a single viewpoint. In some implementations, parts of the user 415 is occluded from the sensors 445 by other parts of the body, external objects, other people, or the like. The occluded portions may be revealed to the sensors 445 at later times or in subsequent images and added to the representation 470. Thus, in some implementations, the representation 470 of the user 415 includes image data from more than a single view (e.g., more than 1 frame of data or image of a camera). In some implementations, the sensors 445 of the HMD 425 include a plurality of image sensors. In some implementations, the image sensors of the HMD 425 include an array of outward, inward, and downward facing image sensors. In some implementations, the array of outward facing image sensors for the HMD 425 provide a 360° view or less than a 360° view around the user 415 of the HMD 425. In some implementations, the array of inward facing image sensors for the HMD 425 provide a view of a face (e.g., gaze direction, facial expressions, physiological characteristics of the eyes, etc.) of the user 415. In some implementations, the array of downward facing image sensors for the HMD 425 provide a view of the torso, arms, hands, and feet of the user 415.

In some implementations, the representation 470 of the user 415 includes a temporal characteristic or condition. For example, the accumulated information in the representation 470 may be preserved for a prescribed interval of time such as 30 seconds. In another example, the accumulated information in the representation 470 may be preserved throughout the use of the video telephone application 450 (e.g., the length of the video telephone call). In some implementations, when the accumulated information in the representation 470 is maintained, the representation 470 displays all portions of the user's body for which 3D appearance data has been received if viewable in the current pose of the user 415. In yet another example, the accumulated information in the representation 470 may be preserved for one day (e.g., 9 am to 5 pm). Alternatively, the accumulated information in the representation 470 may be reset manually by the user 415. In some implementations, the representation 470 of the user 415 includes only current image information and when a portion of the user 415 is no longer captured in image data, that part of the representation 470 disappears.

Figure 5:
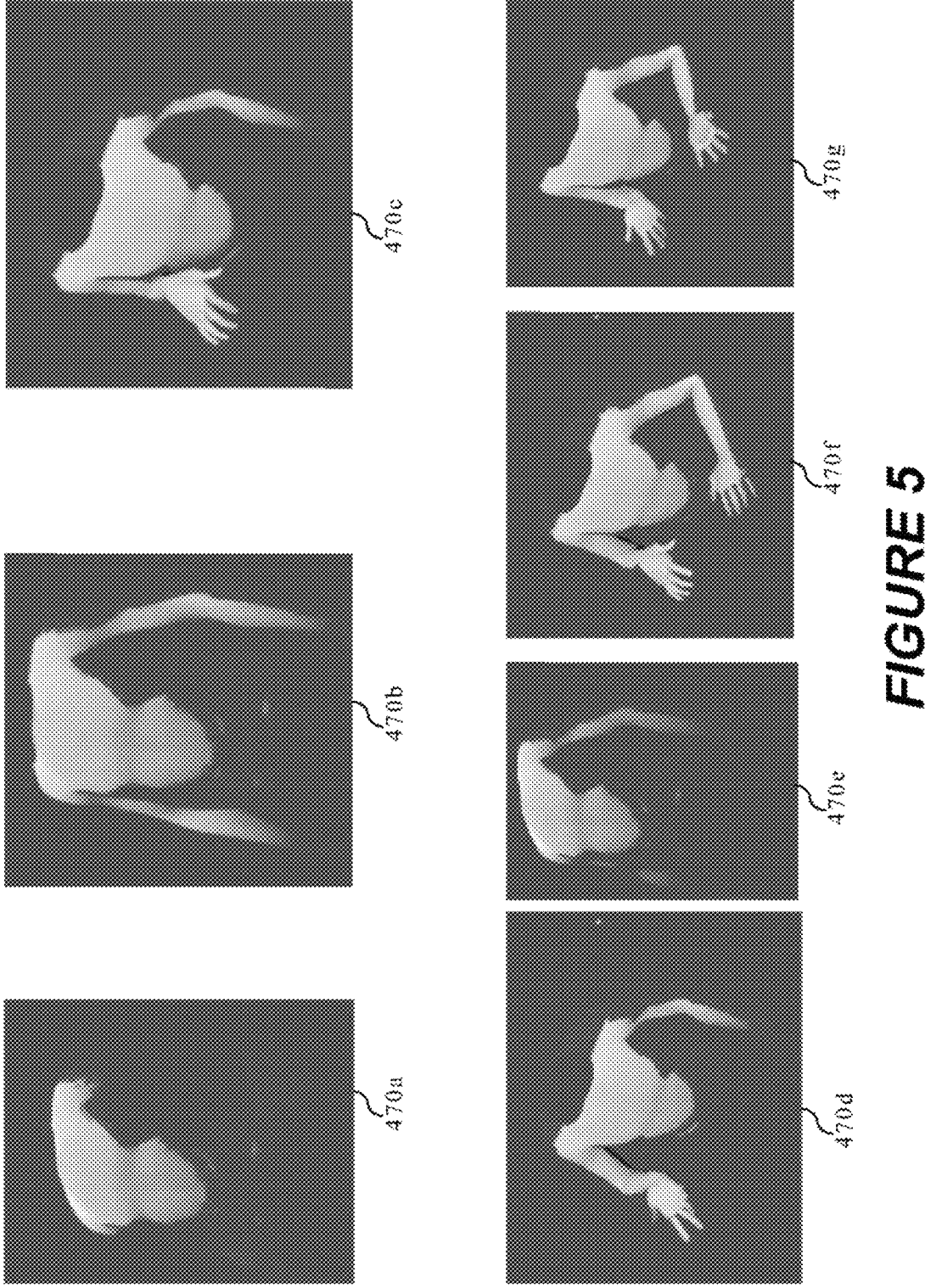
FIG. 5 is a diagram that illustrates progressive live accumulation of 3D appearance data for a representation of a user of an electronic device in accordance with some implementations.

FIG. 5 is a diagram that illustrates progressive live accumulation of 3D appearance data for a representation of a user of an electronic device in accordance with some implementations. As shown in FIG. 5, a first example representation 470a of the user 415 includes limited torso information. At a later point in time, a second example representation 470b of the user 415 includes limited torso information and some depiction of both arms of the user 415. At a later point in time, a third example representation 470c of the user 415 includes limited torso information, some depiction of both arms, and a portion of a back of the right hand of the user 415. At a later point in time, a fourth example representation 470d of the user 415 includes limited torso information, some depiction of both arms, and a portion of a front of the right hand of the user 415. At a later point in time, a fifth example representation 470e of the user 415 includes limited torso information and a portion of both arms of the user 415. At a later point in time, a sixth example representation 470f of the user 415 includes limited torso information, some depiction of both arms, and a portion of the back of both hands of the user 415. At a later point in time, a seventh example representation 470g of the user 415 includes limited torso information, some depiction of both arms, and a portion of the front of both hands of the user 415. As shown in FIG. 5, the representation 470 of the user 415 includes only current information from the sensors 445 and when portion of the user 415 is not detected by the sensors, the corresponding portion of the representation 470 is no longer depicted. For example, the progressive live capture of 3D appearance data for the representation 470 of the user 415 shown in FIG. 5 may occur during execution of a communication application by the HMD 425. In some alternative implementations, an avatar of the user 415 is always fully depicted (e.g., including torso, arms, shoulders, head, legs, etc.) and is updated to reflect the current appearance of the user 415 when images of the body of the user 415 are captured by the sensors 445. For example, corresponding portions of the fully depicted avatar of the user 415 may be updated to include only current information from the sensors 445.

In some implementations, an appearance of the representation 470 of the user 415 uses color image data and depth data from the sensors 445 to generate the appearance of the representation 470. For example, the color or surface information (e.g., texture) allows the representation 470 to show the current appearance of the user 415 including a current appearance of clothes, clothing accessories, skin, fingernail polish, jewelry, etc. being worn. Accordingly, the appearance of the representation 470 illustrates the user 415 as viewable on a particular day. In some implementations, 3D appearance data of the representation 470 accumulated over time is used to progressively develop a model of the user 415 or a map of the clothing, skin and other aspects of the user's body.

In some implementations, the user 415 may control additional characteristics beyond the data retention or progressive update limits of the representation 470. For example, the user 415 limits the representation 470 to the chest and above (e.g., so the user 415 may wear shorts) during the video telephone application 450. In another example, the user 415 may look at a new ring or a new tattoo so that a newly purchased item may be shared using the representation 470 in the video telephone application 450.

In some implementations, the representation 470 of the user 415 is an avatar. In some implementations, the representation 470 of the user 415 is an avatar that is progressively updated by 3D appearance data to be more accurate or descriptive during execution of the video telephone application 450. In some implementations, the representation 470 of the user 415 is an avatar that reflects the user 415 as they look on that day or at that a specific time (e.g., rolls up the sleeves of a long sleeve shirt). In some implementations, the representation 470 of the user 415 is an avatar that is initially an approximate shape and dimensions of the user 415.

In some implementations, the accumulated 3D appearance data of the user 415 is used to determine a customized 3D body model that is used to determine the avatar for the user 415. In some implementations, the accumulated 3D appearance data of the user 415 is based on 2D image data, 3D image data, depth data, etc. from the sensors 445 at the HMD 425. In some implementations, the customized 3D body model is refined over time to more closely approximate the shape, pose, deformation, surface information, etc. for the user 415.

In one implementation, the accumulated 3D appearance data of the user 415 is used with a generic human body model (e.g., including joints, skeleton, deformable shapes or surfaces) to generate the customized 3D body model. First, in this implementation, the image sensors 445 of the HMD 425 capture images of a portion of the user 415 (e.g., the back of their hand). Second, in this implementation, a tracking or fitting process that obtains a generic human model (e.g., hand model) and fits the generic hand model to the actual hands of the user 415 based on the captured images (e.g., 2D images of the hand) to generate a customized human model. In some implementations, the generic human model or the generic hand model includes an internal skeleton with joint and bone representations and a deformation model that shows how the surface (e.g., skin) should deform as the skeleton of the model moves. In some implementations, fitting portions of a representation of the user 415 to preset generic models uses known image processing techniques (to fit a generic version of this model to a user) based on 2D image data. Third, in this implementation, computer vision techniques are used to predict where the joints of the body part (e.g., hand) are in the 2D camera images, and by analyzing the positions or orientations of the joints of the body part, the customized model is used to predict the appearance of the body part (e.g., what the hand should look like). Fourth, in this implementation, color information from the 2D images is analyzed and then applied to corresponding locations on the positioned customized body part model (e.g., positioned hand model). In some implementations, the third and fourth processes are repeated to progressively update the appearance of the body part model (e.g., of the hand model). In some implementations, all processes are repeated to update the appearance of the body part model (e.g., of the hand model).

In some implementations, the live and progressive update of the avatar of the user 415 captures 3D images of a portion of the user 415 and generates a customized body model to predict an appearance or pose of that body part using 3D image processing techniques and subsequent computer vison techniques. In some implementations, the customized 3D body model for the user 415 is generated using machine learning (ML) techniques. Thus, in some implementations, predicting the shape or pose of the user 415 to generate the avatar may involve using ML networks trained using data from the particular user 415 or a training set of data of the shape and pose of many people.

In some implementations, wrinkle patterns or wrinkle maps for the clothing on the avatar of the user 415 is modeled based on a pose of the avatar. Thus, in some implementations, the wrinkle pattern is parameterized on the underlying pose. In some implementations, 3D appearance data of the clothing is modified based on wrinkle maps corresponding to the underlying pose changes.

In some implementations, the HMD 425 has a graphical user interface (GUI), one or more processors, memory and one or more modules, programs or sets of instructions stored in the memory for performing multiple functions. In some implementations, the user 415 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

FIG. 6 is a flowchart illustrating an exemplary method of progressively providing more and more data defining a 3D representation (e.g., avatar) of a user for rendering a view of the 3D representation on the same or another electronic device in accordance with some implementations. The progressive provision is beneficial since the device's (e.g., HMD's) sensors will not be able to see all of the user's body initially or at the same time. In some implementations, the 3D representation will be more complete over time. For example, color information may be added to the user's 3D representation using captured image data. As a specific example, when the user rolls up their sleeves, then the user's arms will change color from the color of the shirt to the color of the user's skin. In some implementations, the method 600 is performed by a device (e.g., electronic device 120, 200 of FIGS. 1-2). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains 2D image data of a user during each of multiple segments of time, wherein different parts of the user are depicted in the 2D image data obtained during the multiple segments of time. In some implementations, a HMD obtains 2D image data of a user from an array of outward facing image sensors, an array of downward facing image sensors, or an array of inward facing image sensors. In some implementations, a downward facing image sensor on the HMD sees a part of the user's torso, legs, or feet. In some implementations, an outward facing image sensor on the HMD sees a part of the user's hand such as the back of the user's hand. In some implementations, an inward facing image sensor on the HMD sees part or all of the user's face. In some implementations, the different parts of the user depicted in the 2D image data are less than all of the user (e.g., from a single viewpoint). In some implementations, the 2D image data may be a still image, series of images, video, etc. In some implementations, the 2D image data further includes depth information such as a corresponding depth map.

At block 620, the method 600 updates 3D appearance data corresponding to a representation (e.g., avatar) of the user for (e.g., following) each of the multiple segments of time, wherein the 3D appearance data is updated to define an appearance of the different parts of the representation of the user based on the 2D image data obtained during each of the multiple segments of time. In some implementations, the updated 3D appearance data corresponding to the representation of the user uses only sensor data from the HMD user's device. In some implementations, color information is added to the appearance of the different parts of the representation of the user are based on the obtained 2D image data. In some implementations, the updated 3D appearance data progressively updates the representation of the user.

In some implementations, the appearance of the different parts of the representation of the user is maintained for a prescribed period of time. The prescribed period of time may be manually set or manually overridden. In some implementations, the appearance of the representation of the user is maintained during execution of an application by the device. In some implementations, the appearance of the representation of the user is maintainedexternal until the HMD is turned off. In some implementations, the appearance of the different parts of the representation of the user is maintained for a prescribed period of time based on a confidence value of the appearance of the different parts. In some implementations, there is a temporal aspect to the different parts of the representation (e.g., hands, torso, etc.), which may decay over time. In some implementations, the different parts of the representation (e.g., hands, torso, etc.) decay over different respective time periods (e.g., different rates of decay).

In some implementations, the representation of the user a 3D avatar. In some implementations, the updated 3D appearance data progressively improves an amount of the avatar that is displayed. In some implementations, the updated 3D appearance data increase a quality of the appearance of the avatar over time. For example, a shape or pose of the avatar more closely matches the user over time. In some implementations, the avatar is shown wearing the same clothes that the user is wearing.

At block 630, the method 600 provides the updated 3D appearance data for rendering an updated view of the representation. In some implementations, the representation of the user is updated following each of the multiple segments of time.

In some implementations, the multiple segments of time occur during a communication session with a second device and updating the 3D appearance data corresponding to the representation of the user progressively updates the representation of the user during the communication session. In some implementations, the method 600 further includes sending the updated 3D appearance data to the second device, where the representation is updated on the second device based on the updated 3D appearance data.

In some implementations, the representation of the user of the HMD is a photo-realistic avatar. In some implementations, the representation of the user of the HMD is an avatar that dynamically tracks facial expressions of the user of the HMD. For example, when the HMD executes a video telephone application, the user would appear in the video call as the avatar of the user. In some implementations in the video telephone application, the user could also show any virtual content that the user is using or viewing. In some implementations, the 2D image data further includes audio information such as an audio stream of the user of the HMD, background audio, or spatialized audio data. In some implementations in different applications (e.g., the video telephone application), the avatar of the user of the HMD may be lip synchronized to the corresponding audio.

In some implementations at block 620, the appearance of the different parts of the representation of the user are defined by fitting a generic human model (e.g. a human body model) to the user's body based on the 2D/3D images. For example, a generic hand model may be fitted to the user's detected actual hand based on the 2D/3D images. In some implementations, the generic body model may include an internal skeleton with joint and bone representations. In some implementations, the generic body model may include a deformation model that determines skin deformation based on movement of the skeleton. In some implementations, computer vision analysis techniques are used to predict joint location for the skeleton based on the 2D/3D images. In some implementations, positions or orientations of the joints in the skeleton may be used to predict shape or appearance of the different parts (e.g., hands) of the 3D representation of the user.

In some implementations, the representation of the user initially includes no sensor data or uses a default appearance (e.g., generic or individualized). In some implementations, the moment the sensors of the HMD start collecting data while executing an application, the representation of the user includes some data. For example, the application may execute just for the HMD user to create their own avatar. Alternatively, an application may execute for the HMD user to create a film of their own avatar in real time.

In some implementations, image data at the device is from an RGB camera, a depth sensor, an RGB-D camera, monochrome cameras, one or more 2D cameras, event cameras, IR cameras, or the like. In some implementations, combinations of sensors are used. In some implementations, the sensor is used to generate a XR environment representing the physical environment. In some implementations, the image data and data from other sensors are used to generate virtual content for the XR environment including the physical environment. In some implementations, color images can be used. Alternatively, in some implementations, grayscale images can be used.

Figure 7:
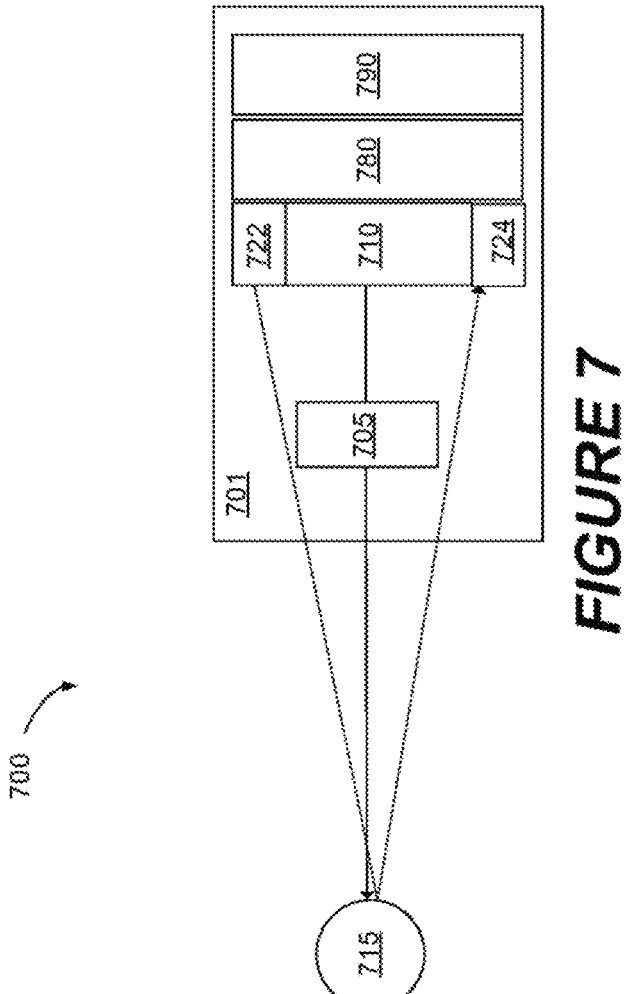
FIG. 7 illustrates an exemplary head mounted device (HMD) in accordance with some implementations.

FIG. 7 illustrates a block diagram of an exemplary HMD 700 in accordance with some implementations. In some implementations, the device 700 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 715. Moreover, the illumination source of the device 700 may emit NIR light to illuminate the eyes of the user 715 and the NIR camera may capture images of the eyes of the user 715.

As shown in FIG. 7, the head-mounted device 700 includes a housing 701 (or enclosure) that houses various components of the head-mounted device 700. The housing 701 includes (or is coupled to) an eye pad (not shown) disposed at a proximal (to the user 715) end of the housing 701. In various implementations, the eye pad is a plastic or rubber piece that comfortably and snugly keeps the head-mounted device 700 in the proper position on the face of the user 715 (e.g., surrounding the eye of the user 715).

The housing 701 houses a display 710 that displays an image, emitting light towards or onto the eye of a user 715. In various implementations, the display 710 emits the light through an eyepiece having one or more lenses 705 that refracts the light emitted by the display 710, making the display appear to the user 715 to be at a virtual distance farther than the actual distance from the eye to the display 710. For the user 715 to be able to focus on the display 710, in various implementations, the virtual distance is at least greater than a minimum focal distance of the eye (e.g., 7 cm). Further, in order to provide a better user experience, in various implementations, the virtual distance is greater than 1 meter.

The housing 701 also houses a tracking system including one or more light sources 722, camera 724, and a controller 780. The one or more light sources 722 emit light onto the eye of the user 715 that reflects as a light pattern (e.g., a circle of glints) that can be detected by the camera 724. Based on the light pattern, the controller 780 can determine an eye tracking characteristic of the user 715. For example, the controller 780 can determine a gaze direction of one or both eyes of the user 715. In another example, the controller 780 can determine a blinking state (eyes open or eyes closed) of the user 715. As yet another example, the controller 780 can determine saccadic movements, a pupil center, blinking (e.g., rate or duration), a pupil size, or a point of regard. Moreover, the point of gaze estimated from the eye tracking images may enable gaze-based interaction with content shown on the near-eye display of the device 700. Thus, in various implementations, the light is emitted by the one or more light sources 722, reflects off the eye of the user 715, and is detected by the camera 724. In various implementations, the light from the eye of the user 715 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In some implementations, eye tracking (or, in particular, a determined gaze direction) is used to track a focal distance of the user 715 (e.g., over time). In some implementations, eye tracking (or, in particular, a determined gaze direction) is also used to enable user interaction (e.g., the user 715 selects an option on the display 710 by looking at it), provide foveated rendering (e.g., present a higher resolution in an area of the display 710 the user 715 is looking at and a lower resolution elsewhere on the display 710), or correct distortions (e.g., for images to be provided on the display 710).

In various implementations, the one or more light sources 722 emit light towards the eye of the user 715 which reflects in the form of a plurality of glints.

In various implementations, the camera 724 is a frame/shutter-based camera that, at a particular point in time or multiple points in time at a frame rate, generates an image of the eye of the user 715. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera comprising a plurality of light sensors (e.g., a matrix of light sensors) at a plurality of respective locations that, in response to a particular light sensor detecting a change in intensity of light, generates an event message indicating a particular location of the particular light sensor.

In some implementations, the device 700 uses 3D computer vision reconstruction techniques to generate a 3D map of a physical environment 705. In some implementations, the device 700 obtains image(s) of the physical environment 705 using one or more image sensors 790 (e.g., camera or depth sensor). In some implementations, the image is a 2D image or a 3D image. In some implementations, the image sensor 790 is an outward-facing sensor at the device 700. In some implementations, the image sensor 790 can be a RGB camera, a depth sensor, a RGB-D camera, one or more 2D cameras, IR cameras, or the like. In some implementations, combinations of sensors are used. In some implementations, the images are used to generate the 3D map of the physical environment 705 at the device 700. In some implementations, the image sensor 790 is used to generate a XR environment representing at least a portion of the physical environment 705. In some implementations, the XR environment is generated using Visual Inertial Odometry (VIO) or Simultaneous Localization and Mapping (SLAM) position tracking or the like at the device 700. In some implementations, color images can be used. Alternatively, in some implementations, grayscale images can be used.

A person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 8:
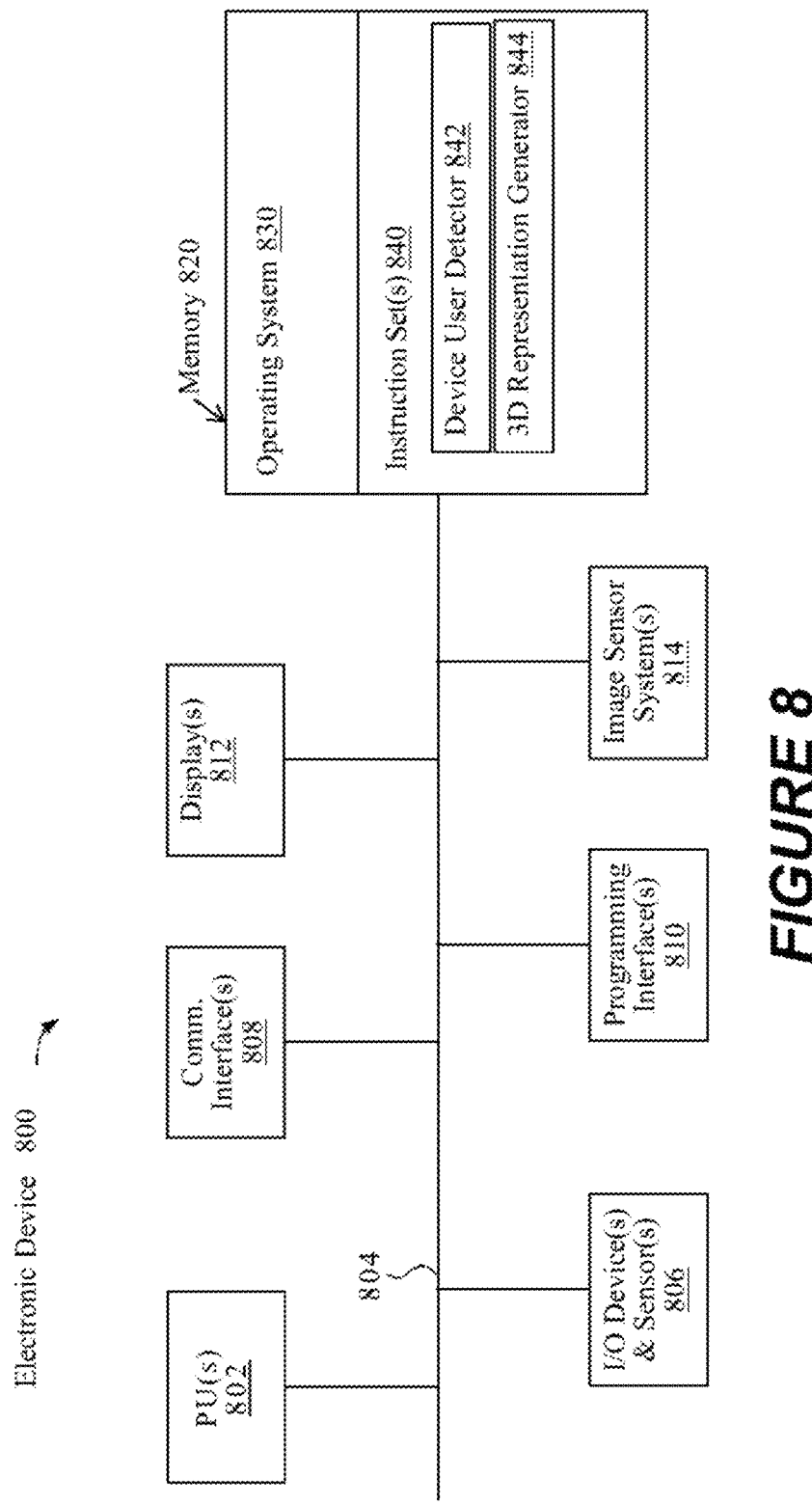
FIG. 8 illustrates an example electronic device in accordance with some implementations.

FIG. 8 is a block diagram of an example device 800. Device 800 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 800 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 810, one or more displays 812, one or more interior or exterior facing sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 812 are configured to present content to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 812 correspond to diffractive, reflective, polarized, holographic, etc. waveguide displays. For example, the electronic device 800 may include a single display. In another example, the electronic device 800 includes a display for each eye of the user.

In some implementations, the one or more interior or exterior facing sensor systems 814 include an image capture device or array that captures image data or an audio capture device or array (e.g., microphone) that captures audio data. The one or more image sensor systems 814 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 814 further include an illumination source that emits light such as a flash. In some implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

In some implementations, the instruction set(s) 840 include a device user detector 842 that is executable by the processing unit(s) 802 to capture sensor data representing a user of the device 800 according to one or more of the techniques disclosed herein.

In some implementations, the instruction set(s) 840 include a 3D representation generator 844 that is executable by the processing unit(s) 802 to determine a 3D representation of the user of the electronic device according to one or more of the techniques disclosed herein. In some implementations, the 3D representation generator 844 is executed to determine an appearance of the 3D representation using the captured sensor data representing the user of the electronic device.

Although the instruction set(s) 840 are shown as residing on a single device, it should be understood that in other implementations, any combination of the elements may be located in separate computing devices. FIG. 8 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a processor of a device:

obtaining two-dimensional (2D) image data during multiple segments of time, wherein obtaining the 2D image data comprises obtaining first 2D image data during a first segment of time and depicting a first appearance of a first portion of a user and obtaining second 2D image data during a second segment of time differing from the first segment of time and depicting a second appearance of a second portion of the user different than the first part portion of the user, the first appearance differing from the second appearance and the second appearance corresponding to a physical element added to the second portion of the user;

updating three-dimensional (3D) appearance data corresponding to a representation of the user for each of the multiple segments of time, wherein the 3D appearance data is updated to define an appearance of the first and second portions of the user for the representation of the user based on the 2D image data obtained during each of the multiple segments of time; and providing the updated 3D appearance data for rendering an updated view of the representation of the user for each of the multiple segments of time, the updated view of the representation of the user providing a first representation of the first portion of the user with the first appearance and a second representation of the second portion of the user with the second appearance with respect to the multiple segments of time.

2. The method of claim 1, wherein the representation of the user is an avatar.

3. The method of claim 1, wherein:

the multiple segments of time occur during a communication session between the device and a second device; and updating the 3D appearance data corresponding to the representation of the user progressively updates the representation of the user during the communication session.

4. The method of claim 1, further comprising adding color information to the updated 3D appearance data of the representation of the user based on the 2D image data.

5. The method of claim 1, further comprising:

fitting a 3D human model to at least one of the different parts of the representation of the user based on the obtained 2D image data.

6. The method of claim 5, wherein the 3D human model comprises an internal skeleton with joint and bone representations, wherein positions and orientations of the joints are used to predict a shape of the at least one of multiple different parts of the representation of the user.

7. The method of claim 5, further comprising:

deforming a 3D surface model to represent a surface of the at least one of multiple different parts of the representation of the user based on the obtained 2D image data and the fitted 3D human model.

8. The method of claim 5, further comprising:

using computer vision modeling to predict where joint locations in the at least one of different parts of the representation of the user based on the obtained 2D image data.

9. The method of claim 1, wherein movement of the user is obtained during the multiple segments of time.

10. The method of claim 1, wherein the representation of the user is an avatar that dynamically tracks facial expressions of the user.

11. The method of claim 10, wherein the avatar of the user is lip synchronized to corresponding audio data.

12. The method of claim 1, wherein the device is a head-mounted device (HMD).

13. A system comprising:

memory; and one or more processors at a device coupled to the memory, wherein the memory comprises program instructions that, when executed on the one or more processors, cause the system to perform operations comprising:

obtaining two-dimensional (2D) image data during multiple segments of time, wherein obtaining the 2D image data comprises obtaining first 2D image data during a first segment of time and depicting a first appearance of a portion of a user and obtaining second 2D image data during a second segment of time that differs from the first segment of time and depicting a second appearance of the portion of the user that differs from the first appearance, the second appearance corresponding to a change resulting from a physical element added to the portion of the user;

updating three-dimensional (3D) appearance data corresponding to a representation of the user for each of the multiple segments of time, wherein the 3D appearance data is updated to define an appearance of the portion of the user for the representation of the user based on the 2D image data obtained during each of the multiple segments of time; and providing the updated 3D appearance data for rendering an updated view of the representation of the user for each of the multiple segments of time, the updated view of the representation of the user providing a first representation of the portion of the user with the first appearance and a second representation of the portion of the user with the second appearance with respect to the multiple segments of time.

14. The system of claim 13, wherein:

the multiple segments of time occur during a communication session between the device and a second device; and updating the 3D appearance data corresponding to the representation of the user progressively updates the representation of the user during the communication session.

15. The system of claim 13, wherein the operations further comprise adding color information to the updated 3D appearance data of the representation of the user based on the 2D image data.

16. The system of claim 13, wherein the first appearance represents the portion of the user at least partially covered with a first item and the second appearance represents the portion of the user at least partially covered with a second item differing from the first appearance item.

17. The system of claim 13, wherein the first appearance represents the portion of the user with a first article of clothing and the second appearance represents the portion of the user with a second article of clothing differing from the first article of clothing.

18. The system of claim 13, wherein the first appearance represents a full view of the portion of the user and the second appearance represents at least a partially occluded view of the portion of the user.

19. The system of claim 13, wherein the first appearance represents the portion of the user with a first surface or color and the second appearance represents the portion of the user with a second surface or color differing from the first surface or color.

20. A non-transitory computer-readable storage medium, storing program instructions executable via one or more processors to perform operations comprising:

obtaining two-dimensional (2D) image data during multiple segments of time, wherein obtaining the 2D image data comprises obtaining first 2D image data during a first segment of time and depicting a first appearance of a portion of a user and obtaining second 2D image data during a second segment of time that differs from the first segment of time and depicting a second appearance of the portion of the user that differs from the first appearance, the second appearance corresponding to a change resulting from a physical element added to the portion of the user;

updating three-dimensional (3D) appearance data corresponding to a representation of the user for each of the multiple segments of time, wherein the 3D appearance data is updated to define an appearance of the portion of the user for the representation of the user based on the 2D image data obtained during each of the multiple segments of time; and providing the updated 3D appearance data for rendering an updated view of the representation of the user for each of the multiple segments of time, the updated view of the representation of the user providing a first representation of the portion of the user with the first appearance and a second representation of the portion of the user with the second appearance with respect to the multiple segments of time.

\* \* \* \* \*